(12) United States Patent
Kumar et al.

(10) Patent No.: US 11,163,963 B2
(45) Date of Patent: Nov. 2, 2021

(54) NATURAL LANGUAGE PROCESSING USING HYBRID DOCUMENT EMBEDDING

(71) Applicant: Optum Technology, Inc., Eden Prairie, MN (US)

(72) Inventors: Shashi Kumar, Bangalore (IN); Suman Roy, Bangalore (IN); Vishal Pathak, Bhopal (IN)

(73) Assignee: Optum Technology, Inc., Eden Prairie, MN (US)

( * ) Notice: Subject to any disclaimer, the term of this patent is extended or adjusted under 35 U.S.C. 154(b) by 0 days.

(21) Appl. No.: 16/823,612

(22) Filed: Mar. 19, 2020

(65) Prior Publication Data

US 2021/0073471 A1    Mar. 11, 2021

Related U.S. Application Data

(60) Provisional application No. 62/898,137, filed on Sep. 10, 2019.

(51) Int. Cl.
*G06F 40/279* (2020.01)
*G06F 40/30* (2020.01)
*G06N 20/20* (2019.01)

(52) U.S. Cl.
CPC ............ *G06F 40/30* (2020.01); *G06F 40/279* (2020.01)

(58) Field of Classification Search
CPC ......... G06F 40/279; G06F 40/30; G06N 3/08; G06N 3/084; G06N 20/20

(Continued)

(56) References Cited

U.S. PATENT DOCUMENTS 7,788,264 B2    8/2010   Zhu et al.
8,356,086 B2    1/2013   Liu et al.
(Continued)

FOREIGN PATENT DOCUMENTS

CN    104199829 A    12/2014

OTHER PUBLICATIONS

"Deeply Moving: Deep Learning For Sentiment Analysis," (6 pages), [article], [online], [Retrieved from the Internet Dec. 18, 2019] <https://nlp.stanford.edu/sentiment/>.

(Continued)

*Primary Examiner* — Martin Lerner
(74) *Attorney, Agent, or Firm* — Alston & Bird LLP

(57) ABSTRACT

There is a need for more effective and efficient natural language processing. This need can be addressed by, for example, solutions for performing/executing natural language processing using hybrid document embedding. In one example, a method includes identifying a natural language document associated with one or more document attributes, wherein the natural language document comprises one or more natural language words; determining an attribute-based document embedding for the natural language document, wherein the attribute-based document embedding is generated based on a document vector for the natural language document and a word vector for each natural language word of the one or more natural language words; processing the attribute-based document embedding using a predictive inference model to determine one or more document-related predictions for the natural language document; and performing one or more prediction-based actions based on the one or more document-related predictions.

20 Claims, 7 Drawing Sheets

(58) Field of Classification Search
USPC .................................... 704/1, 9; 706/20, 21
See application file for complete search history.

(56) References Cited

U.S. PATENT DOCUMENTS

| | | | |
|---|---|---|---|
| 8,515,879 | B2 | 8/2013 | Huh et al. |
| 8,682,649 | B2 | 3/2014 | Bellegarda |
| 8,719,302 | B2 | 5/2014 | Bailey et al. |
| 9,501,525 | B2 | 11/2016 | Barker et al. |
| 10,565,234 | B1* | 2/2020 | Sims ................... G06F 40/30 |
| 2012/0310627 | A1* | 12/2012 | Qi ....................... G06F 40/30 704/9 |
| 2014/0280361 | A1 | 9/2014 | Aliferis et al. |
| 2015/0220833 | A1* | 8/2015 | Le ...................... G06F 40/284 706/16 |
| 2017/0046601 | A1 | 2/2017 | Chang et al. |
| 2017/0116204 | A1 | 4/2017 | Davulcu et al. |
| 2018/0285459 | A1* | 10/2018 | Soni ..................... G06N 20/00 |
| 2018/0357302 | A1 | 12/2018 | Qi et al. |
| 2018/0357531 | A1* | 12/2018 | Giridhari ............. G06N 20/00 |
| 2019/0347552 | A1* | 11/2019 | Le ...................... G06F 40/284 |
| 2020/0019618 | A1* | 1/2020 | Srirangamsridharan ................... G06F 40/40 |
| 2020/0074312 | A1* | 3/2020 | Liang ................... G06F 40/30 |
| 2020/0110809 | A1* | 4/2020 | DeFelice ............. G06F 40/295 |
| 2020/0184016 | A1* | 6/2020 | Roller .................. G06N 20/10 |
| 2020/0184355 | A1* | 6/2020 | Mehta .................. H04L 41/16 |
| 2020/0226126 | A1* | 7/2020 | Zou ..................... G06F 40/284 |
| 2020/0293873 | A1* | 9/2020 | Dai ..................... G06F 40/279 |
| 2021/0034964 | A1* | 2/2021 | Chu ...................... G06N 3/08 |

OTHER PUBLICATIONS

"Sentiment Analysis," General Architecture For Text Engineering, (2 pages), [article], [online], [Retrieved from the Internet Dec. 18, 2019] <https://gate.ac.uk/applications/sentiment.html>.

"Sentiment Analysis," OpenText, (6 pages), [article], [online], [Retrieved from the Internet 2019-12-18] Khttps://www.opentext.com/products-and-solutions/products/discovery/information-access-platform/sentiment-analysis>.

"Tone Analyzer," IBM Watson, (10 pages), [online], [Retrieved from the Internet Dec. 19, 2019] Khttps://www.IBM.com/watson/services/tone-analyzer/>.

Alshari, Eissa et al. "Improvement Of Sentiment Analysis Based On Clustering of Word2Vec Features," In 28th International Workshop on Database and Expert Systems Applications (DEXA), Aug. 29, 2017, pp. 123-126. IEEE.

Arbelaitz, Olatz et al. "An Extensive Comparative Study of Cluster Validity Indices," Pattern Recognition, vol. 46, No. 1, (2013), pp. 243-256.

Bagheri, Ayoub et al. "ADM-LDA: An Aspect Detection Model Based On Topic Modelling Using The Structure Of Review Sentences," Journal of Information Science 2014, vol. 40, Issue 5, pp. 621-636.

Blei, David M. et al. "Latent Dirichlet Allocation," Journal of Machine Learning Research, vol. 3, (2003), pp. 993-1022.

Boyd-Graber, Jordan et al. "Holistic Sentiment Analysis Across Languages: Multilingual Supervised Latent Dirichlet Allocation," Proceedings of the 2010 Conference On Empirical Methods In Natural Language Processing, Oct. 9, 2010, pp. 45-55.

Ding, Chris et al. "Orthogonal Non-Negative Matrix Tri-Factorizations For Clustering," In Proceedings of the Twelfth ACM SIGKDD International Conference on Knowledge Discovery and Data Mining, Aug. 20, 2006, pp. 126-135.

Griffiths, Griffiths and M. Steyvers. Finding scientific topics. Proceedings of the National Academy of Sciences, Apr. 6, 2004, vol. 101, Suppl. 1, pp. 5228-5235.

Hb, Balalhi Ganesh et al. "Distributional Semantic Representation In Health Care Text Classification," 2016, (4 pages).

He, Zhaoshui et al. "Symmetric Nonnegative Matrix Factorization: Algorithms and Applications To Probabilistic Clustering." IEEE Transactions On Neural Networks, vol. 22, No. 12, Dec. 2011, pp. 2117-2131.

Hofmann, Thomas. "Probabilistic Latent Semantic Indexing," In SIGIR Forum, (1999), pp. 50-57, ACM.

Hu, Xia et al. "Unsupervised Sentiment Analysis With Emotional Signals," In Proceedings of the 22nd International Conference on World Wide Web May 13, 2013, pp. 607-618. ACM.

Keiningham, Timothy L. et al. "A Longitudinal Examination Of Net Promoter and Firm Revenue Growth," Journal of Marketing, vol. 71, No. 3, Jul. 2007, pp. 39-51.

Kim, Soo-Min et al. "Determining The Sentiment Of Opinions," In Proceedings of the 20th International Conference on Computational Linguistics Aug. 23, 2004, (7 pages), Association for Computational Linguistics.

Kuang, Da et al. "Nonnegative Matrix Factorization for Interactive Topic Modeling and Document Clustering," Springer International publishing Switzerland 2015, pp. 215-243. DOI: 10.1007/978-3-319-09259-1_7.

Lee, Daniel D. et al. "Algorithms For Non-Negative Matrix Factorization," In Advances In Neural Information Processing Systems 13, pp. 556-562, MIT Press, 2001. T.K. Leen, T.G. Dietterick, and V. Tresp, Editors.

Li, Tao et al. "A Non-Negative Matrix Tri-Factorization Approach To Sentiment Classification With Lexical Prior Knowledge." In Proceedings of the 47th Annual Meeting of the ACL and the 4th International Joint Conference On Natural Language Processing of the AFNLP, pp. 244-252, Aug. 2, 2009, Suntec, Singapore.

Li, Tao et al. "Knowledge Transformation From Word Space To Document Space," In Proceedings of the 31st Annual International ACM SIGIR'08, pp. 187-194, Jul. 20, 2008, Singapore.

Lin, Chenghua et al. "Joint Sentiment Topic Model For Sentiment Analysis," In Proceedings of the 18th ACM Conference on Information and Knowledge Management, CIKM '09, pp. 375-384, Nov. 2, 2009. ACM.

Liu, Bing et al. "Opinion Observer: Analyzing and Comparing Opinions On The Web," In Proceedings of the 14th International Conference on World Wide Web, WWW'05, pp. 342-351, May 10, 2005, Chiba, Japan.

Mei, Qiaozhu et al. "Automatic Labeling of Multinomial Topic Models," In Proceedings of the 13th ACM SIGKDD International Conference on Knowledge Discovery and Data Mining, pp. 490-499, Aug. 12, 2007, San Jose, California.

Mei, Qiaozhu et al. "Topic Sentiment Mixture: Modeling Facets and Opinions In Weblogs," In Proceedings of the 16th International Conference on World Wide Web, WWW'07, pp. 171-180, May 8, 2007, Banff, Alberta, Canada.

Mikolov, Tomas et al. "Efficient Estimation Of Word Representations In Vector Space," pp. 1-12, arXiv 1301.3781 v3 [cs.CL], Sep. 7, 2013.

O'HARE, Neil et al. "Topic-Dependent Sentiment Analysis Of Financial Blogs," In Proceedings of the 1st International CIKM Workshop On Topic-Sentiment Analysis For Mass Opinion Measurement, Nov. 6, 2009, pp. 9-16, Hong Kong, China. ACM.

Pang, Bo et al. "Opinion Mining and Sentiment Analysis," Foundations and Trends In Information Retrieval, vol. 2, No. 1-2, pp. 1-135, (2008).

Pang, Bo et al. "Thumbs Up? Sentiment Classification Using Machine Learning Techniques," In Proceedings of the 2002 Conference on Empirical Methods in Natural Language Processing (EMNLP), arXiv:cs/0205070v1 [cs.CL], May 28, 2002.

Poddar, Lahari et al. "Author-Aware Aspect Topic Sentiment Model To Retrieve Supporting Opinions From Reviews," In Proceedings of the 2017 Conference on Empirical Methods in Natural Language Processing, EMNLP'17, pp. 472-481, Sep. 7, 2017, Copenhagen, Denmark.

Rahman, Md Mustafizur et al. "Hidden Topic Sentiment Model," In Proceedings of the 25th International Conference on World Wide Web, WWW '16, pp. 155-165, Apr. 11, 2016, Montreal, Quebec, Canada.

Titov, Ivan et al. "A Joint Model of Text and Aspect Ratings For Sentiment Summarization," In Proceedings of ACL-08: Hlt, pp. 308-316, Jun. 2008, Association For Computational Linguistics.

(56) References Cited

OTHER PUBLICATIONS

Turney, Peter D. "Thumbs Up Or Thumbs Down? Semantic Orientation Applied To Unsupervised Classification Of Reviews," In Proceedings of the 40th Annual Meeting of the Association for Computational Linguistics (ACL)'04, pp. 417-424, Jul. 6, 2002.
W. Xu, X. Liu, and Y. Gong., "Document Clustering Based On Non-Negative Matrix Factorization," In Proceedings of the 26th Annual International ACM SIGIR Conference on Research and Development in Information Retrieval, SIGIR '03, pp. 267-273, Jul. 28, 2003. ACM.
Waggoner, Alexander A. "Triple Non-Negative Matrix Factorization Technique For Sentiment Analysis and Topic Modeling," (2017), CMC Senior Theses.1550, Claremont McKenna College, (25 pages). [Retrieved from the Internet Dec. 18, 2019] <https://scholarship.claremont.edU/cmc_theses/1550/>.
Yan, Xiaohui et al. "Learning Topics In Short Texts By Non-Negative Matrix Factorization On Term Correlation Matrix," In Proceedings of the 13th SIAM International Conference on Data Mining, May 2, 2013, pp. 749-757, Society For Industrial and Applied Mathematics.
Zhao, Jun et al. "Adding Redundant Features For CRFs-Based Sentence Sentiment Classification," In Proceedings of the 2008 Conference on Empirical Methods in Natural Language Processing, EMNLP '08, pp. 117-126, Oct. 2008, Association for Computational Linguistics, Honolulu, Hawaii.

\* cited by examiner

| Sub-category | Category | Feedback |
|---|---|---|
| Waiting (Phone, Payment or General) | Representative/Agent | The new online authorization tool is not very user friendly. The ease of authorizing procedures and diagnostics 501 |
| Call Transfer | Representative/Agent | UnitedHealthcare makes getting payment, always needs medical records, very hard. 502 |
| Administrative | Representative/Agent | Website information does not always match what your customer service representative sees on their side. 503 |
| Administrative | Administrative | Splitting claims into separate line items and paying them at different times makes posting of payments |
| Paperwork | Administrative | Less requests for some med information, more medications coverage, less paper work from Optum. |
| Other Policy-related issues | Policy | It seems that a large number of MRIs are subject to post service review, in particular spinal, and joint MRIs. 504 |
| Agent Not Helpful | Claims | Reimbursement policies are the worst. |
| Claim Filing Limit | | How UnitedHealthcare handles claims is cumbersome and time consuming. |
| | Payment | Appealed timely filing claims not paid/resolved. No provider representative. increased reimbursement. |

FIG. 5

| Sub-category | Category | Feedback |
|---|---|---|
| Waiting (Phone, Payment or General) | Representative/Agent | The new online authorization tool is not very user friendly. The ease of authorizing procedures and diagnostics |
| Call Transfer | Representative/Agent | UnitedHealthcare makes getting payment, always needs medical records, very hard. |
| Knowledge/Training | Representative/Agent | Website information does not always match what your customer service representative sees on their side. |
| Administrative | Administrative | Splitting claims into separate line items and paying them at different times makes posting of payments |
| Paperwork | Administrative | Less requests for some med information, more medications coverage, less paper work from Optum. |
| Review process | Administrative | It seems that a large number of MRIs are subject to post service review, in particular spinal, and joint MRIs. |
| Other Policy-related issues | Policy | Reimbursement policies are the worst. |
| Agent Not Helpful | Claims | How UnitedHealthcare handles claims is cumbersome and time consuming. |
| Claim Filing Limit | Claims | Appealed timely filing claims not paid/resolved. No provider representative. |
| Reimbursement-related | Payment | Increased reimbursement. |

FIG. 7

NATURAL LANGUAGE PROCESSING USING HYBRID DOCUMENT EMBEDDING

CROSS-REFERENCE TO RELATED APPLICATIONS

This application claims priority to U.S. Provisional Application No. 62/898,137, filed Sep. 10, 2019, which is hereby incorporated herein in its entirety by reference.

BACKGROUND

Various embodiments of the present invention address technical challenges related to performing natural language processing. Various embodiments of the present address the shortcomings of existing natural language processing systems and disclose various techniques for efficiently and reliably performing natural language processing.

BRIEF SUMMARY

In general, embodiments of the present invention provide methods, apparatus, systems, computing devices, computing entities, and/or the like for performing/executing hybrid document embedding natural language processing. Certain embodiments utilize systems, methods, and computer program products that perform/execute hybrid document embedding natural language processing using one or more of attribute-based document embeddings, hybrid document embedding models, word-detection optimization goals, and attribute-detection optimization goals.

In accordance with one aspect, a method is provided. In one embodiment, the method comprises identifying a natural language document associated with one or more document attributes, wherein the natural language document comprises one or more natural language words; determining an attribute-based document embedding for the natural language document, wherein: (i) the attribute-based document embedding is generated based at least in part on a document vector for the natural language document and a word vector for each natural language word of the one or more natural language words; (ii) the document vector for the natural language document and each word vector for a natural language word of the one or more natural language words are generated using a hybrid document embedding model; (iii) the hybrid document embedding model comprises a predictor model and a classifier model; (iv) the predictor model is configured to update the document vector for the natural language document and each word vector for a natural language word of the one or more natural language words based at least in part on a word-detection optimization goal; and (v) the classifier model is configured to update the document vector for the natural language document based at least in part on an attribute-detection optimization goal; processing the attribute-based document embedding using a predictive inference model to determine one or more document-related predictions for the natural language document; and performing one or more prediction-based actions based at least in part on the one or more document-related predictions.

In accordance with another aspect, a computer program product is provided. The computer program product may comprise at least one computer-readable storage medium having computer-readable program code portions stored therein, the computer-readable program code portions comprising executable portions configured to identify a natural language document associated with one or more document attributes, wherein the natural language document comprises one or more natural language words; determine an attribute-based document embedding for the natural language document, wherein: (i) the attribute-based document embedding is generated based at least in part on a document vector for the natural language document and a word vector for each natural language word of the one or more natural language words; (ii) the document vector for the natural language document and each word vector for a natural language word of the one or more natural language words are generated using a hybrid document embedding model; (iii) the hybrid document embedding model comprises a predictor model and a classifier model; (iv) the predictor model is configured to update the document vector for the natural language document and each word vector for a natural language word of the one or more natural language words based at least in part on a word-detection optimization goal; and (v) the classifier model is configured to update the document vector for the natural language document based at least in part on an attribute-detection optimization goal; process the attribute-based document embedding using a predictive inference model to determine one or more document-related predictions for the natural language document; and perform one or more prediction-based actions based at least in part on the one or more document-related predictions.

In accordance with yet another aspect, an apparatus comprising at least one processor and at least one memory including computer program code is provided. In one embodiment, the at least one memory and the computer program code may be configured to, with the processor, cause the apparatus to identify a natural language document associated with one or more document attributes, wherein the natural language document comprises one or more natural language words; determine an attribute-based document embedding for the natural language document, wherein: (i) the attribute-based document embedding is generated based at least in part on a document vector for the natural language document and a word vector for each natural language word of the one or more natural language words; (ii) the document vector for the natural language document and each word vector for a natural language word of the one or more natural language words are generated using a hybrid document embedding model; (iii) the hybrid document embedding model comprises a predictor model and a classifier model; (iv) the predictor model is configured to update the document vector for the natural language document and each word vector for a natural language word of the one or more natural language words based at least in part on a word-detection optimization goal; and (v) the classifier model is configured to update the document vector for the natural language document based at least in part on an attribute-detection optimization goal; process the attribute-based document embedding using a predictive inference model to determine one or more document-related predictions for the natural language document; and perform one or more prediction-based actions based at least in part on the one or more document-related predictions.

BRIEF DESCRIPTION OF THE DRAWINGS

Figure 1:
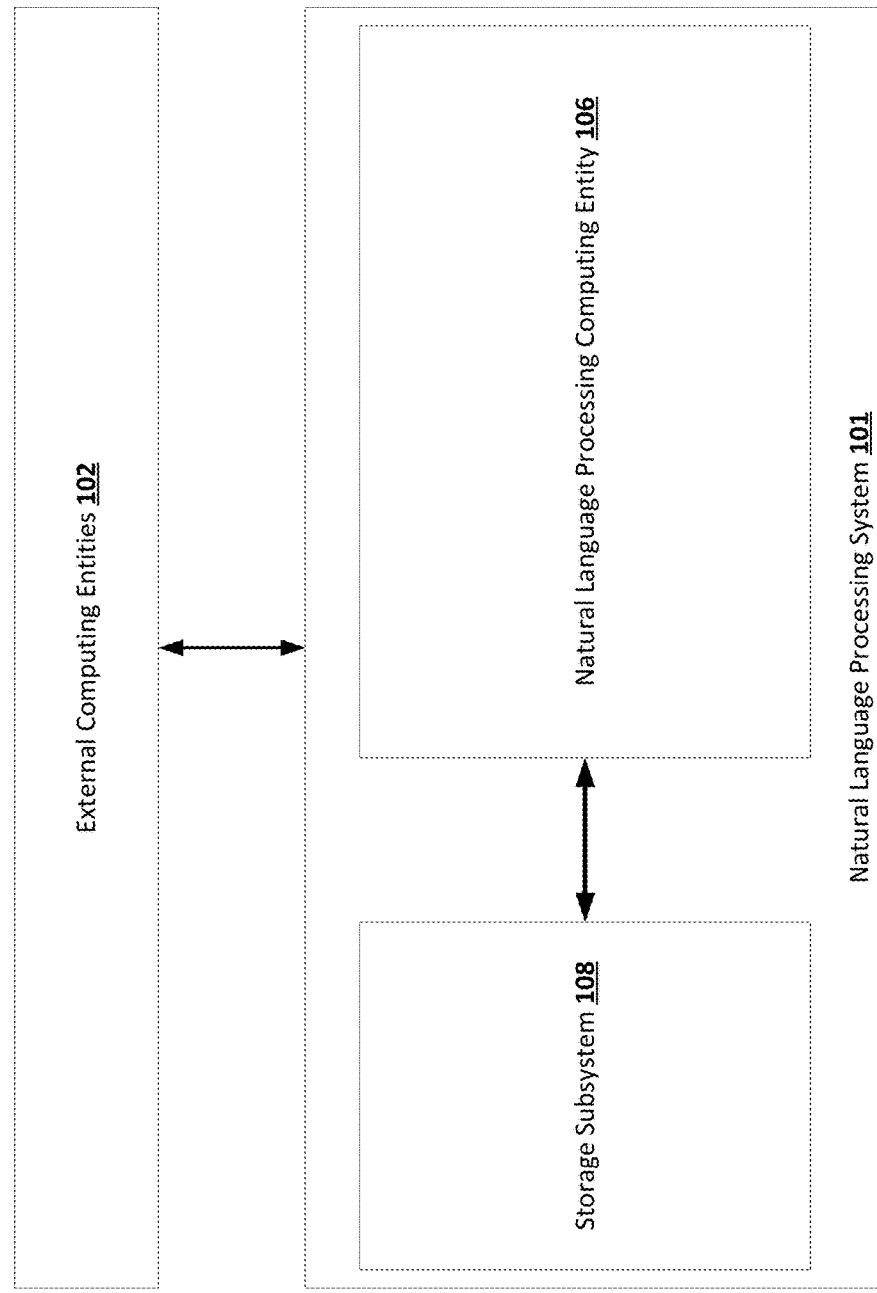

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
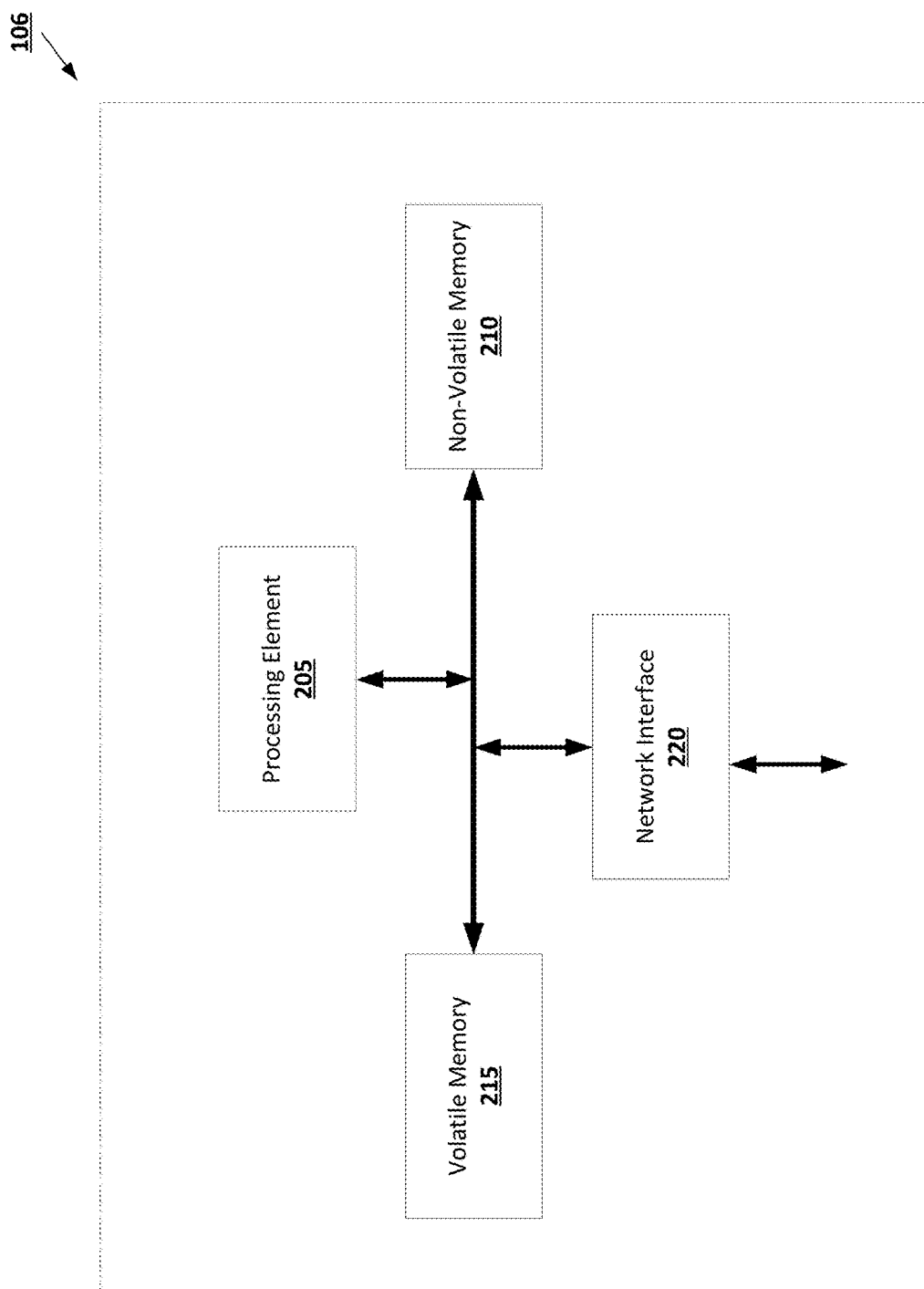

FIG. 2 provides an example natural language processing computing entity in accordance with some embodiments discussed herein.

Figure 3:
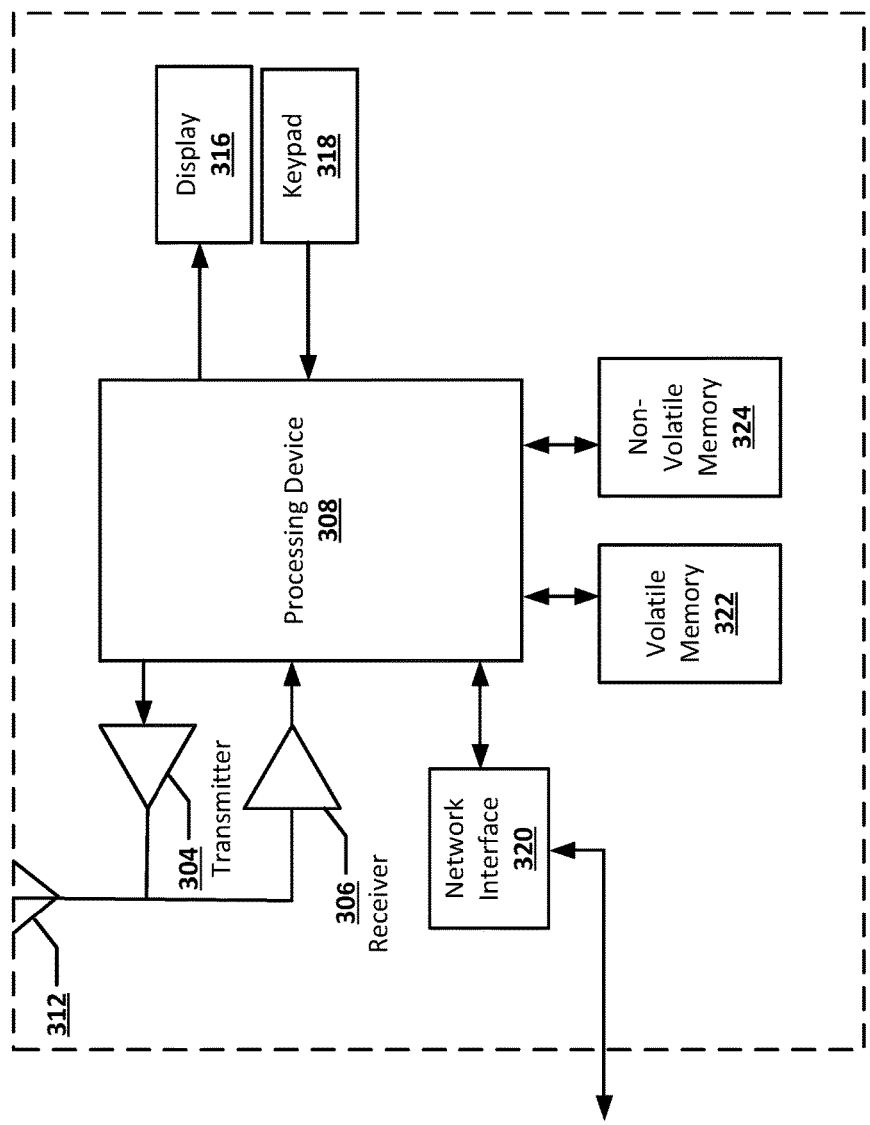

FIG. 3 provides an example external computing entity in accordance with some embodiments discussed herein.

Figure 4:
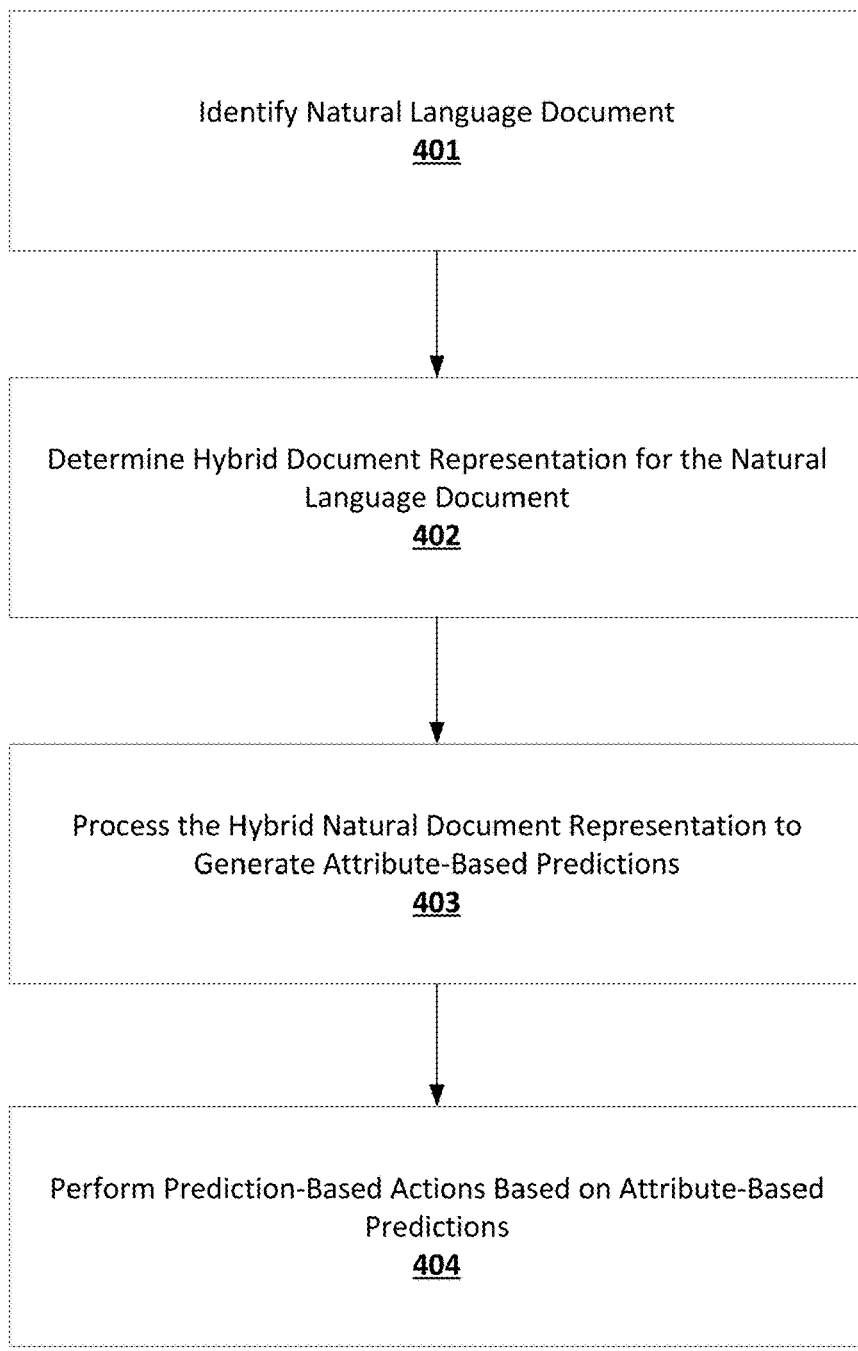

FIG. 4 is a flowchart diagram of an example process for performing natural language processing using hybrid document embeddings in accordance with some embodiments discussed herein.

FIG. 5 provides an operational example of various attribute-document combinations in accordance with some embodiments discussed herein.

Figure 6:
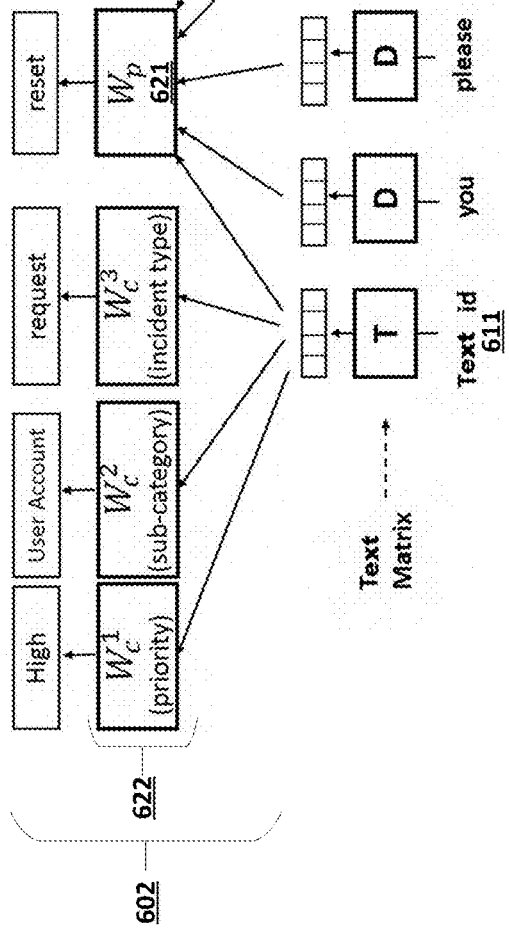

FIG. 6 provides an operational example of a trained hybrid document embedding model in accordance with some embodiments discussed herein.

FIG. 7 provides an operational example of various prediction-based actions in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Various embodiments of the present invention address technical challenges related to efficiently and effectively performing natural language processing based on short text data. Because of their short size, short texts present unique challenges for natural language processing. To address the noted challenges, various embodiments of the present invention utilize attribute data associated with short text data to generate document-wide representations of the short text data. In some embodiments, to perform processing on attribute-enriched short text data (which may also be addressed as incident tickets), various embodiments of the present invention utilize a hybrid document embedding model comprising a predictor model characterized by a word-detection optimization goal and a classifier model characterized by an attribute-detection optimization goal. By utilizing the predictor model and the classifier model, various embodiments of the present invention utilize attribute data to extract meaningful predictive features from short texts and use the noted predictive features to efficiently and effectively perform natural language processing. In doing so, various embodiments of the present invention address technical challenges related to efficiently and effectively performing natural language processing based on short text data and make important technical contributions to efficiently and effectively performing natural language processing based on short text data.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 is a schematic diagram of an example architecture 100 for performing/executing natural language processing using hybrid document embedding. The architecture 100 includes a natural language processing system 101 configured to receive natural language processing requests from external computing entities 102, process the natural language processing requests to generate natural language processing outputs, provide the natural language processing outputs to the external computing entities 102, and automatically perform prediction-based actions based on natural language processing outputs. An example of a natural language processing task is detecting missing attribute fields of incident tickets, detecting incorrect attribute fields of incident tickets, finding semantic relatedness between a pair of incident tickets, detecting classification tasks of incident tickets, and so on.

In some embodiments, natural language processing system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The natural language processing system 101 may include a natural language processing computing entity 106 and a storage subsystem 108. The natural language processing computing entity 106 may be configured to receive natural language processing requests from one or more external computing entities 102, process the natural language processing requests to generate natural language processing outputs, provide the natural language processing systems to the external computing entities 102, and automatically perform anomaly resolution policies in response to detecting anomaly scenarios.

The storage subsystem 108 may be configured to store input data used by the natural language processing computing entity 106 to perform natural language processing as well as model definition data used by the natural language processing computing entity 106 to perform various natural language processing tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Natural Language Processing Computing Entity

FIG. 2 provides a schematic diagram of a natural language processing computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the natural language processing computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the natural language processing computing entity 106 may include or be in communication with one or more processing elements 205 (also referred to as processors, processing circuitry, and/or similar terms used herein interchangeably) that communicate with other elements within the natural language processing computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the natural language processing computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the natural language processing computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the natural language processing computing entity 106 with the assistance of the processing element 205 and operating system.

As indicated, in one embodiment, the natural language processing computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the natural language processing computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the natural language processing computing entity 106 may include or be in communication with one or more input elements, such as a keyboard input, a mouse input, a touch screen/display input, motion input, movement input, audio input, pointing device input, joystick input, keypad input, and/or the like. The natural language processing computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the natural language processing computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the natural language processing computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the natural language processing computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the natural language processing computing entity 106 and/or various other computing entities.

In another embodiment, the external computing entity 102 may include one or more components or functionality that are the same or similar to those of the natural language processing computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. EXEMPLARY SYSTEM OPERATIONS

Various embodiments of the present invention address technical challenges related to efficiently and effectively performing natural language processing based on short text data. Because of their short size, short texts present unique challenges for natural language processing. To address the noted challenges, various embodiments of the present invention utilize attribute data associated with short text data to generate document-wide representations of the short text data. In some embodiments, to perform processing on attribute-enriched short text data, various embodiments of the present invention utilize a hybrid document embedding model comprising of a predictor model characterized by a word-detection optimization goal and a classifier model characterized by an attribute-detection optimization goal. By utilizing the predictor model and the classifier model, various embodiments of the present invention utilize attribute data to extract meaningful fixed-length predictive features from short texts and use the noted predictive features to efficiently and effectively perform natural language processing related learning tasks. In doing so, various embodiments of the present invention address technical challenges related to efficiently and effectively performing natural language processing based on short text data and make important technical contributions to efficiently and effectively performing natural language processing based on short text data.

FIG. 4 is a flowchart diagram of an example process 400 for natural language processing using hybrid document embedding. Using the various steps/operations of FIG. 4, the natural language processing computing entity 106 can effectively and efficiently generate hybrid document representations of attributed natural language documents that integrate predictive signals provided by attributes of those attributed natural language documents. Moreover, using the various steps/operations of FIG. 4, the natural language processing computing entity 106 can effectively and efficiently utilize the noted hybrid document representations to perform various natural language processing tasks.

The process 400 begins at step/operation 401 when the natural language processing computing entity 106 identifies a natural language document associated with document attributes. In some embodiments, a natural language document is any collection of one or more natural language words. In some embodiments, a document attribute for a natural language document is any categorical and/or numeric property of the natural language document, such as a category of the natural language document. For example, a natural language document may include text of an incident ticket submitted by a user, while the document attributes of the noted natural language document may include categorical and/or numeric properties of the incident ticket submitted by the user along with the text of the incident ticket. As another example, a natural language document may include text of a physician chart, while the document attributes of the noted natural language document may include properties of the physician chart such as the author physician's practice group as well as categorical and/or numeric properties of the physician chart submitted by the author physician along with the physician chart.

An operational example of various attribute-document combinations 500 is presented in FIG. 5. As depicted in FIG. 5, each attribute-document combination includes two attributes (i.e., a category attribute and a subcategory attribute) and a natural language document. For example, the attribute-document combination 501 is associated with the category "Representative/Agent" and the subcategory "Waiting" (Phone, Payment, or General) as well as the natural language text "The new online authorization tool is not very user friendly." The ease of authorizing procedures and diagnostics." As another example, the attribute-document combination 502 is associated with the category "Representative/Agent" and the subcategory "Call Transfer" as well as the natural language text "UnitedHealthcare makes getting payment, always needs medical records, very hard." As yet another example, the attribute-document combination 503 is associated with the category "Representative/Agent" and a missing subcategory as well as the natural language text "Website information does not always match what your customer service representative sees on their side." As a further example, the attribute-document combination 504 is associated with the category "Claims" and the subcategory "Agent Not Helpful" as well as the natural language text "How UnitedHealthcare handles claims is cumbersome and time consuming."

Returning to FIG. 4, at step/operation 402, the natural language processing computing entity 106 determines an attribute-based embedding for the natural language document using a hybrid document embedding model. In some embodiments, a hybrid document embedding model is a predictive model that, when trained, can generate an attribute-based document embedding for the natural language document in accordance with trained parameters, a word-detection optimization goal and an attribute-detection optimization goal. In some embodiments, a word-detection optimization goal is characterized by detecting a target word for each fixed-size window of the one or more natural language words of the natural language document based on a document vector for the natural language document and each word vector for a natural language word of the one or more natural language words. In some embodiments, the attribute-detection optimization goal is characterized by detecting one or more target attributes of one or more document attributes of the natural language document based on a document vector for the natural language document.

In some embodiments, the attribute-based document embedding is generated based on a document vector for the natural language document and a word vector for each natural language word of the one or more natural language words. In some embodiments, the document vector for the natural language document and each word vector for a natural language word of the one or more natural language words are generated using a hybrid document embedding model. In some embodiments, the hybrid document embedding model comprises a predictor model and a classifier model. In some embodiments, the predictor model is configured to update the document vector for the natural language document and each word vector for a natural language word of the one or more natural language words based on a word-detection optimization goal. In some embodiments, the classifier model is configured to update the document vector for the natural language document based on an attribute-detection optimization goal. In some embodiments, the word-detection optimization goal is characterized by detecting a target word for each fixed-size window of the one or more natural language words of the natural language document based on the document vector for the natural language document and each word vector for a natural language word of the one or more natural language words. In some embodiments, the attribute-detection optimization goal is characterized by detecting one or more target attributes of the one or more document attributes based on the document vector for the natural language document.

An operational example of a trained hybrid document embedding model 600 is presented in FIG. 6. As presented in FIG. 6, the trained hybrid document embedding model 600 includes a predictor model 601 and a classifier model 602. The predictor model 601 is configured to receive context words of a fixed-size window of a natural language model, generate a randomized document vector 611 for the natural language document and a randomized word vector 612 for each context word of the fixed-size window, apply predictor parameter data 621 of the predictor model 601 to the randomized document vector 611 and each randomized word vector 612 for a natural language word to generate activation data for the fixed-size window, generate a predicted focus word of the fixed-size window based on the activation data for the fixed-size window, generate a measure of error for the predicted focus word and an actual focus word of the fixed-size window, and update the document vector 611 and each word vector 612 based on the measure of error.

In some embodiments, given a word window of size k, the focus word includes a word in the [(k/2+1)]st position of the word window of size (k+1), and the context words of the word window include the k/2 words before and after the focus word. In some embodiments, a focus word of a fixed-size word window is the middle word of the fixed-size window. For example, in the operational example of FIG. 6, the predictor model 601 is configured to process the context words "you", "please", "the", and "password" from a natural language document "Can you please reset the password?" to detect the context word "reset". In the noted operational example, the selected window size is four and the predictor model 601 is configured to detect the middle word of a fixed-size window of size four based on the two words preceding the middle word and the two words succeeding the middle word.

As further depicted in FIG. 6, the classifier model 602 is configured to receive the document vector 611, process the document vector 611 in accordance with classifier parameter data 622 to generate activation data for the document vector 611, generate a predicted attribute value for each selected document attribute of at least a selected subset of the document attributes of the natural language document based on the activation data for the document vector 611, generate a measure of error for each selected document attribute based on the predicted attribute value for the selected document attribute and an actual attribute value for the selected document attribute, and update the document vector 611 based on each measure of error for a selected document attribute. In some embodiments, the selected subset of attributes include some or all of the document attributes of the natural language document, e.g., a subset of document attributes determined to have actual values for all of the input natural language documents expected to be provided to the trained hybrid document embedding model 600. In the operational example of FIG. 6, the subset includes a category document attribute, a subcategory document attribute, and an incident type document attribute. In some embodiments, the attribute-based document embedding for the natural language document is generated based on at least one of the document vector 611 for the natural language document and each per-word word vector for each word in the natural language document.

In some embodiments, to generate the trained hybrid document embedding model 600 of FIG. 6, the natural language processing computing entity 106 utilizes a hybrid training routine. In some embodiments, a hybrid training routine is a training routine is configured to determine the predictor parameter data and the classifier parameter data based on the word-detection optimization goal and the attribute-detection optimization goal. In some embodiments, the hybrid training routine optimizes the below loss function in accordance with a stochastic gradient descent training technique:

$$Loss_h(T, D, W_p, b_p, W_c, b_c) = \sum_{i=1}^{n} \sum_{t=k+1}^{l_i-k} \frac{1}{l_i - 2k} \left( \sum_{a=1}^{\gamma} loss_c(i, a) + loss_p(i, t) \right)$$

Equation 1 where T is the matrix containing document vectors for each natural language document, D is the matrix containing word vectors for each word of each natural language document, $W_p$ is the predictor weight data for the trained hybrid document embedding model 600, $b_p$ is the predictor bias data for the trained hybrid document embedding model 600, $W_c$ is the classifier weight data for the trained hybrid document embedding model 600, $b_c$ is the classifier bias data for the trained hybrid document embedding model 600, $Loss_h(T, D, W_p, b_p, W_c, b_c)$ is the loss function configured to optimize $T, D, W_p, b_p, W_c,$ and $b_c$, i is an index variable that iterates over documents (e.g., over ticket summaries), $l_i$ is the length of a corresponding document, t is an index variable that iterates over windows of focus within documents, k is the fixed window size, γ is the number of attributes of each document, $loss_c$ is the classifier model loss function, and $loss_p$ is the predictor model loss function.

Returning to FIG. 4, at step/operation 403, the natural language processing computing entity 106 processes the attribute-based document embedding using a predictive inference model to determine one or more document-related predictions for the natural language document. In some embodiments, the predictive inference model is a predictive model configured to generate a recommended value for each document attribute of the one or more document attributes of the natural language document. For example, the predictive inference model may be configured to receive as input the attribute-based document embedding for a natural language document and process the attribute-based document embedding for the natural language document to generate a recommended value for each document attribute of the one or more document attributes of the natural language document.

In some embodiments, the predictive inference model is a predictive model configured to generate a recommended label for a natural language document. For example, the predictive inference model may be configured to receive as input the attribute-based document embedding for a natural language document and process the attribute-based document embedding for the natural language document to generate a recommended label for the natural language document.

In some embodiments, the predictive inference model is a predictive model configured to generate a similarity score for two or more natural language documents. For example, the predictive inference model may be configured to process attribute-based document embeddings for two or more natural language documents in order to generate a similarity score for two or more natural language documents using some suitable similarity metric.

At step/operation 404, the natural language processing computing entity 106 performs one or more prediction-based actions based on the one or more document-related predictions. In some embodiments, if the one or more document-related predictions include a recommended value for a missing document attribute of a natural language document, the natural language processing computing entity 106 adopts the recommended value as the attribute value for the missing document attribute. In some embodiments, if the one or more document-related predictions include a recommended value for a document attribute of the a natural language document that is different from the current value for the document attribute, the natural language processing computing entity 106 adopts the recommended value as the current value for the particular document attribute. In some embodiments, if the one or more document-related predictions include a recommended label for the natural language document, the natural language processing computing entity 106 directs the natural language document to a responsive agent based on the recommended label. Examples of prediction-based actions include automatic maintenance appointments, automatic audit procedures, automatic customer outreach operations, automatic system-wide load balancing operations, etc.

In some embodiments, performing the one or more prediction-based actions based on the one or more document-related predictions comprises determining that the recommended value for a particular document attribute of the one or more document attributes is different from a current value for the particular document attribute; and adopting the recommended value for the particular document attribute as the current value for the first document value. In some embodiments, performing the one or more prediction-based actions based on the one or more document-related predictions comprises determining that a particular document attribute of the one or more document attributes has no current value; and adopting the recommended value for the particular document attribute as the current value for the first document value. In some embodiments, performing the one or more prediction-based actions based on the one or more document-related predictions comprises classifying the natural language document based on the one or more document-related predictions.

An operational example of various prediction-based actions 700 is presented in FIG. 7. As depicted in FIG. 7, the prediction-based actions 700 include providing the recommended value for the subcategory document attribute of the attribute-document combination 503 of FIG. 5. Moreover, as further depicted in FIG. 7, the prediction-based actions 700 include substituting the prior value for the subcategory document attribute for the attribute-document combination with a recommended value for the subcategory document attribute for the attribute-document combination.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for natural language processing using hybrid document embedding, the computer-implemented method comprising:
identifying, by a processor, a natural language document associated with one or more document attributes, wherein the natural language document comprises one or more natural language words;
determining, by the processor, an attribute-based document embedding for the natural language document, wherein: (i) the attribute-based document embedding is generated based at least in part on a document vector for the natural language document and a word vector for each natural language word of the one or more natural language words; (ii) the document vector for the natural language document and each word vector for a natural language word of the one or more natural language words are generated using a hybrid document embedding model; (iii) the hybrid document embedding model comprises a predictor model and a classifier model; (iv) the predictor model is configured to update the document vector for the natural language document and each word vector for a natural language word of the one or more natural language words based at least in part on a word-detection optimization goal; and (v) the classifier model is configured to update the document vector for the natural language document based at least in part on an attribute-detection optimization goal;

processing, by the processor, the attribute-based document embedding using a predictive inference model to determine one or more document-related predictions for the natural language document; and performing, by the processor, one or more prediction-based actions based at least in part on the one or more document-related predictions.

2. The computer-implemented method of claim 1, the word-detection optimization goal is characterized by detecting a target word for each fixed-size window of the one or more natural language words of the natural language document based at least in part on the document vector for the natural language document and each word vector for a natural language word of the one or more natural language words.

3. The computer-implemented method of claim 1, wherein the attribute-detection optimization goal is characterized by detecting one or more target attributes of the one or more document attributes based at least in part on the document vector for the natural language document.

4. The computer-implemented method of claim 1, wherein:
the predictor model is associated with predictor parameter data,
the classifier model is associated with classifier parameter data,
the predictor model and the classifier predictor model are determined using a hybrid training routine, and
the hybrid training routine is configured to determine the predictor parameter data and the classifier parameter data based at least in part on the word-detection optimization goal and the attribute-detection optimization goal.

5. The computer-implemented method of claim 4, wherein the hybrid training routine utilizes stochastic gradient descent.

6. The computer-implemented method of claim 1, wherein the predictive inference model is configured to generate a recommended value for each document attribute of the one or more document attributes.

7. The computer-implemented method of claim 6, wherein performing the one or more prediction-based actions based at least in part on the one or more document-related predictions comprises:
determining that the recommended value for a first document attribute of the one or more document attributes is different from a current value for the particular document attribute; and
adopting the recommended value for the particular document attribute as the current value for the first document value.

8. The computer-implemented method of claim 6, wherein performing the one or more prediction-based actions based at least in part on the one or more document-related predictions comprises:
determining that a particular document attribute of the one or more document attributes has no current value; and
adopting the recommended value for the particular document attribute as the current value for the first document value.

9. The computer-implemented method of claim 1, wherein performing the one or more prediction-based actions based at least in part on the one or more document-related predictions comprises classifying the natural language document based at least in part on the one or more document-related predictions.

10. The computer-implemented method of claim 1, wherein the natural language document is an incident ticket report.

11. An apparatus for performing natural language, the apparatus comprising at least one processor and at least one memory including program code, the at least one memory and the program code configured to, with the processor, cause the apparatus to at least:
identify a natural language document associated with one or more document attributes, wherein the natural language document comprises one or more natural language words;
determine an attribute-based document embedding for the natural language document, wherein: (i) the attribute-based document embedding is generated based at least in part on a document vector for the natural language document and a word vector for each natural language word of the one or more natural language words; (ii) the document vector for the natural language document and each word vector for a natural language word of the one or more natural language words are generated using a hybrid document embedding model; (iii) the hybrid document embedding model comprises a predictor model and a classifier model; (iv) the predictor model is configured to update the document vector for the natural language document and each word vector for a natural language word of the one or more natural language words based at least in part on a word-detection optimization goal; and (v) the classifier model is configured to update the document vector for the natural language document based at least in part on an attribute-detection optimization goal;
process the attribute-based document embedding using a predictive inference model to determine one or more document-related predictions for the natural language document; and
perform one or more prediction-based actions based at least in part on the one or more document-related predictions.

12. The apparatus of claim 11, the word-detection optimization goal is characterized by detecting a target word for each fixed-size window of the one or more natural language words of the natural language document based at least in part on the document vector for the natural language document and each word vector for a natural language word of the one or more natural language words.

13. The apparatus of claim 11, wherein the attribute-detection optimization goal is characterized by detecting one or more target attributes of the one or more document attributes based at least in part on the document vector for the natural language document.

14. The apparatus of claim 11, wherein:
the predictor model is associated with predictor parameter data,
the classifier model is associated with classifier parameter data,
the predictor model and the classifier predictor model are determined using a hybrid training routine, and
the hybrid training routine is configured to determine the predictor parameter data and the classifier parameter data based at least in part on the word-detection optimization goal and the attribute-detection optimization goal.

15. The apparatus of claim 14, wherein the hybrid training routine utilizes stochastic gradient descent.

16. The apparatus of claim 11, wherein the predictive inference model is configured to generate a recommended value for each document attribute of the one or more document attributes.

17. The apparatus of claim 16, wherein performing the one or more prediction-based actions based at least in part on the one or more document-related predictions comprises:
   determining that the recommended value for a particular document attribute of the one or more document attributes is different from a current value for the particular document attribute; and
   adopting the recommended value for the particular document attribute as the current value for the first document value.

18. The apparatus of claim 16, wherein performing the one or more prediction-based actions based at least in part on the one or more document-related predictions comprises:
   determining that a particular document attribute of the one or more document attributes has no current value; and
   adopting the recommended value for the particular document attribute as the current value for the first document value.

19. The apparatus of claim 11, wherein performing the one or more prediction-based actions based at least in part on the one or more document-related predictions comprises classifying the natural language document based at least in part on the one or more document-related predictions.

20. A computer program product for natural language processing using hybrid document embedding, the computer program product comprising at least one non-transitory computer-readable storage medium having computer-readable program code portions stored therein, the computer-readable program code portions configured to:
   identify a natural language document associated with one or more document attributes, wherein the natural language document comprises one or more natural language words;
   determine an attribute-based document embedding for the natural language document, wherein: (i) the attribute-based document embedding is generated based at least in part on a document vector for the natural language document and a word vector for each natural language word of the one or more natural language words; (ii) the document vector for the natural language document and each word vector for a natural language word of the one or more natural language words are generated using a hybrid document embedding model; (iii) the hybrid document embedding model comprises a predictor model and a classifier model; (iv) the predictor model is configured to update the document vector for the natural language document and each word vector for a natural language word of the one or more natural language words based at least in part on a word-detection optimization goal; and (v) the classifier model is configured to update the document vector for the natural language document based at least in part on an attribute-detection optimization goal;
   process the attribute-based document embedding using a predictive inference model to determine one or more document-related predictions for the natural language document; and
   perform one or more prediction-based actions based at least in part on the one or more document-related predictions.

* * * * *